United States Patent
Chen et al.

(10) Patent No.: US 8,989,719 B2
(45) Date of Patent: Mar. 24, 2015

(54) NON-ACCESS STRATUM (NAS) TRANSPARENT MESSAGING

(75) Inventors: Xuming Chen, San Ramon, CA (US); Andrew Youtz, Rocky Hill, NJ (US); Ho Yin Cheuk, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 396 days.

(21) Appl. No.: 13/331,042

(22) Filed: Dec. 20, 2011

(65) Prior Publication Data

US 2013/0157700 A1    Jun. 20, 2013

(51) Int. Cl.
*H04Q 7/00* (2006.01)
*H04L 12/58* (2006.01)

(52) U.S. Cl.
CPC ...................................... *H04L 51/38* (2013.01)
USPC ........ 455/414.4; 455/466; 370/465; 370/466; 370/467

(58) Field of Classification Search
CPC ............. H04W 4/12; H04W 4/14; H04W 4/18
USPC .......... 455/466, 410, 467, 433; 370/328, 400, 370/401, 398, 465–467
See application file for complete search history.

(56) References Cited

U.S. PATENT DOCUMENTS

| | | | | |
|---|---|---|---|---|
| 2009/0111423 A1* | 4/2009 | Somasundaram et al. | ..... | 455/410 |
| 2010/0265884 A1* | 10/2010 | Vikberg et al. | ............... | 370/328 |
| 2011/0069618 A1* | 3/2011 | Wong et al. | ................... | 370/244 |
| 2011/0098063 A1* | 4/2011 | Richardson | ................... | 455/466 |
| 2011/0269457 A1* | 11/2011 | Liu et al. | ........................ | 455/433 |
| 2012/0052859 A1* | 3/2012 | Cai et al. | ..................... | 455/426.1 |

OTHER PUBLICATIONS

"3$^{rd}$ Generation Partnership Project; Technical Specification Group Core Network and Terminals; Non-Access Stratum (NAS) protocol for Evolved Packet System (EPS); Stage 3 (Release 11)", 3GPP TS 24.301, V11.0.0, Sep. 2011, 323 pages.

* cited by examiner

*Primary Examiner* — Ajit Patel
*Assistant Examiner* — Julio Perez (57) ABSTRACT

A device receives, from an application server, a message destined for a user equipment, and reformats the message into a non-access stratum (NAS) transparent message. The device also provides, to a home subscriber server, a query for an identification of a mobility management entity serving the user equipment, and receives, from the home subscriber server, the identification of the mobility management entity serving the user equipment. The device further provides the NAS transparent message to the identified mobility management entity, where the mobility management entity forwards the NAS transparent message to the user equipment.

19 Claims, 7 Drawing Sheets

FIG. 1

NON-ACCESS STRATUM (NAS) TRANSPARENT MESSAGING

BACKGROUND

A fourth generation (4G) wireless network is an all Internet protocol (IP) wireless network in which different advanced multimedia application services (e.g., voice over IP (VoIP) content, video content, etc.) are delivered over IP. 4G wireless networks include a radio access network, such as, for example, a long term evolution (LTE) network or an enhanced high rate packet data (eHRPD) network. 4G wireless networks also include an IP multimedia subsystem (IMS) network and a wireless core network, referred to as an evolved packet core (EPC) network. The LTE network is often called an evolved universal terrestrial radio access network (E-UT-RAN). The EPC network is an all-IP packet-switched core network that supports high-speed wireless and wireline broadband access technologies. An evolved packet system (EPS) is defined to include the LTE (or eHRPD) network and the EPC network.

Two components of the EPS are a home subscriber server (HSS) and a mobility management entity (MME). The HSS is provided in the IMS network and includes a database, which stores user equipment (UE) subscriber profile information. The MME is provided in the EPC network and is responsible for handling control plane signaling with UEs as the UEs are provided access to different packet data networks (PDNs).

Non-access stratum (NAS) is a highest stratum of a control plane between a UE and a MME. NAS protocols support mobility of the UE and further support session management procedures to establish and maintain IP connectivity between the UE and a packet data network (PDN) gateway (PGW). NAS protocols define rules for a mapping between parameters during inter-system mobility with third generation (3G) networks. NAS protocols also provide NAS security by integrity protection and ciphering of NAS signaling messages. To enable transfer of application protocol messages between the MME and the UE, NAS protocols define a generic container message on the downlink (e.g., a downlink generic NAS transport message) and define another generic container message on the uplink (e.g., an uplink generic NAS transport message). However, current networks do not fully utilize the capabilities of NAS messaging and are unable to exchange enough information via a typical IP transport.

DETAILED DESCRIPTION OF PREFERRED EMBODIMENTS

The following detailed description refers to the accompanying drawings. The same reference numbers in different drawings may identify the same or similar elements.

Systems and/or methods described herein may enable NAS transparent messages to be provided between a MME and a UE. Content of the NAS transparent messages may be transparent to the MME so that the MME may not need to decode and understand the content of the messages. The UE and a device (e.g., an application server) originating or receiving the NAS transparent message may agree on a format of the content. The NAS transparent message may include a flag to indicate a nature of the message and an application to which the message is to be sent. If the UE does not recognize the flag in the NAS transparent message, the UE may ignore the NAS transparent message. The NAS transparent messaging provided by the systems and/or methods may enable more information to be exchanged between a UE and a MME (or an application server) than may be permitted via a typical IP transport.

As used herein, the terms "subscriber" and/or "user" may be used interchangeably. Also, the terms "subscriber" and/or "user" are intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
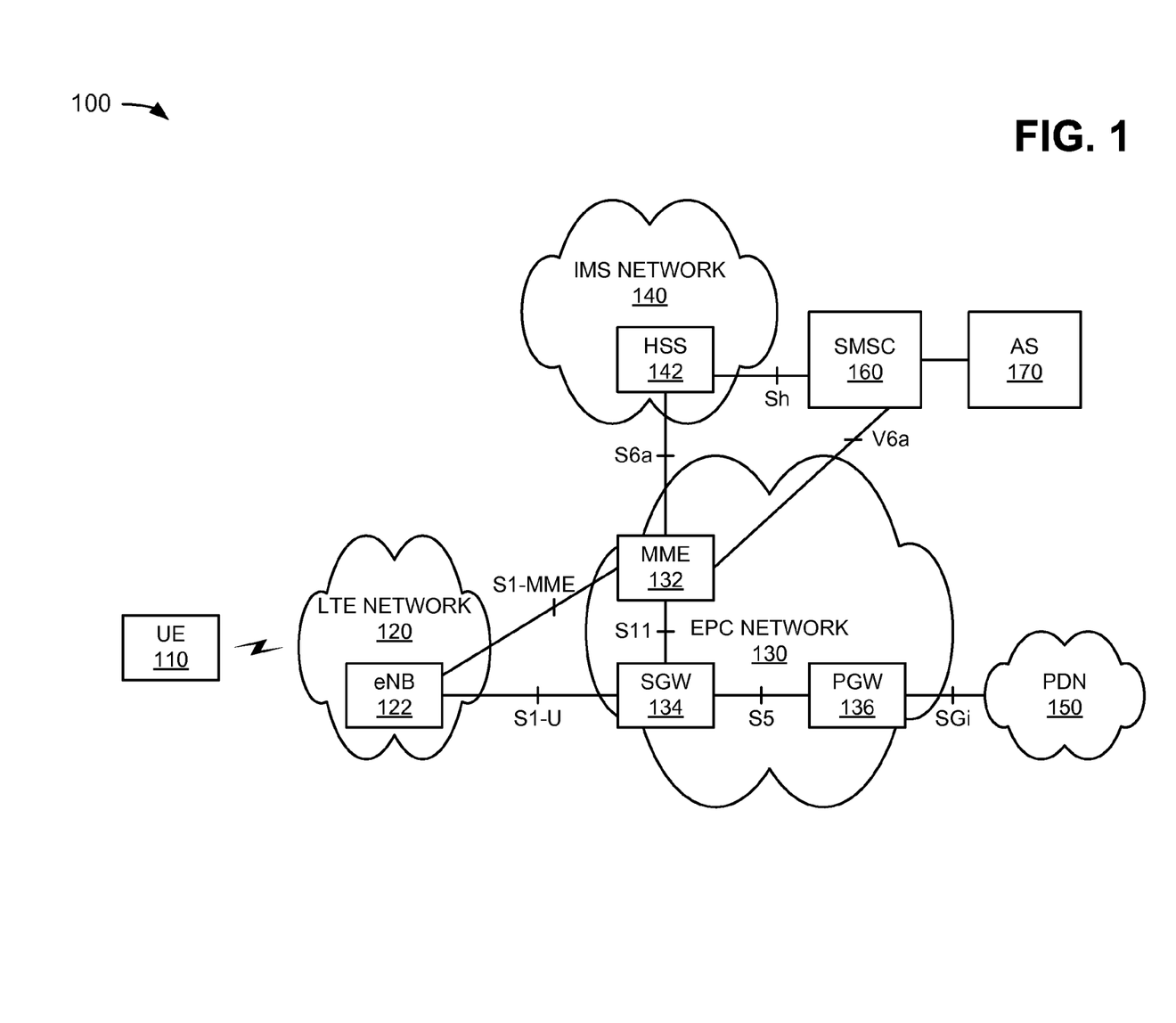
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110, a LTE network 120, an EPC network 130, an IMS network 140, a PDN 150, a short message service center (SMSC) 160, and an application server (AS) 170. LTE network 120 may include a base station or an eNodeB (eNB) 122. EPC network 130 may include a MME 132, a serving gateway (SGW) 134, and a PDN gateway (PGW) 136. IMS network 140 may include a HSS 142. Devices and/or networks of network 100 may interconnect via wired and/or wireless connections.

A single UE 110, LTE network 120, eNB 122, EPC network 130, MME 132, SGW 134, PGW 136, IMS network 140, HSS 142, PDN 150, SMSC 160, and application server 170 have been illustrated in FIG. 1 for simplicity. In practice, there may be more UEs 110, LTE networks 120, eNBs 122, EPC networks 130, MMEs 132, SGWs 134, PGWs 136, IMS networks 140, HSSs 142, PDNs 150, SMSCs 160, and/or application servers 170. As further shown in FIG. 1, eNB 122 may interface with MME 132 over a S1-MME interface, and may interface with SGW 134 over a S1-U interface. MME 132 may interface with SGW 134 over a S11 interface, and may interface with HSS 142 over a S6a interface. SGW 134 may interface with PGW 136 over a S5 interface. PGW 136 may interface with PDN 150 over a SGi interface, and may interface with PCRF 160 over a Gx interface.

SMSC 160 may interface with HSS 142 over a Sh interface, and may interface with MME 132 over a V6a interface. The Sh interface may include all the features of a Diameter protocol Sh interface and may be enhanced to enable SMSC 160 to query HSS 142 for an identification of a MME (e.g., MME 132) serving UE 110. The V6a interface may include an interface that complies with all Diameter protocol standard procedures. The V6a interface may enable the following example messages: a message-delivery-request (MDR) from SMSC 160 to MME 132; a message-delivery-answer (MDA) from MME 132 to SMSC 160 in response to a MDR; a message-submission-request (MSR) from MME 132 to SMSC 160; a message-submission-answer (MSA) from SMSC 160 to MME 132 in response to a MSR; etc. In one example, MME 132 may act as a Diameter client over the V6a interface, and SMSC 160 may act as a Diameter server over the V6a interface. MME 132 may utilize the V6a interface to relay NAS transparent messages between UE 110 and SMSC 160.

UE 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a wireless air card), or other types of computation and communication devices. In one example, UE 110 may include a device that is capable of communicating over LTE network 120, EPC network 130, IMS network 140, and/or PDN 150.

LTE network 120 may include a communications network that connects subscribers (e.g., UEs 110) to a service provider. In one example, LTE network 120 may include a WiFi network (e.g., using IEEE 802.11 standards) or other access networks (e.g., an E-UTRAN or an eHRPD network). In another example, LTE network 120 may include a radio access network capable of supporting high data rate, low latency, packet optimization, large capacity and coverage, etc.

eNB 122 may include one or more computation and communication devices that receive traffic (e.g., voice and/or data) from MME 132 and/or SGW 134 and wirelessly transmit that traffic to UE 110. eNB 122 may also include one or more devices that wirelessly receive traffic from UE 110 and transmit that traffic to one of MME 132 and/or SGW 134 or to other UEs 110. eNB 122 may combine the functionalities of a base station and a radio network controller (RNC) in second generation (2G) or 3G radio access networks.

EPC network 130 may include a core network architecture of the Third Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and communication devices that may be responsible for idle mode tracking and paging procedures (e.g., including retransmissions) for UE 110. MME 132 may be involved in a bearer activation/deactivation process (e.g., for UE 110) and may choose a SGW for UE 110 at an initial attach and at a time of intra-LTE handover. MME 132 may authenticate UE 110 via interaction with HSS 142. MME 132 may generate and allocate temporary identities to UEs 110. MME 132 may check authorization of UE 110 to camp on a service provider's Public Land Mobile Network (PLMN) and may enforce roaming restrictions for UE 110. MME 132 may be a termination point in EPC network 130 for ciphering/integrity protection for NAS signaling and may handle security key management. MME 132 may provide a control plane function for mobility between LTE and access networks.

SGW 134 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 134 may route and forward user data packets, may act as a mobility anchor for a user plane during inter-eNB handovers, and may act as an anchor for mobility between LTE and other 3GPP technologies. For an idle state UE 110, SGW 134 may terminate a downlink (DL) data path and may trigger paging when DL traffic arrives for UE 110. SGW 134 may manage and store contexts (e.g., parameters of an IP bearer service, network internal routing information, etc.) associated with UE 110.

PGW 136 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 136 may provide connectivity of UE 110 to external PDNs (e.g., PDN 150) by being a traffic exit/entry point for UE 110. UE 110 may simultaneously connect to more than one PGW 136 for accessing multiple PDNs 150. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services.

HSS 142 may include one or more computation and communication devices that gather, process, search, and/or provide information in a manner described herein. In one example implementation, HSS 142 may include a master user database that supports devices of IMS network 140 that handle calls. HSS 142 may include subscription-related information (e.g., subscriber profiles), may perform authentication and authorization of a user of UE 110, and may provide information about UE 110's location and IP information. In one example implementation, HSS 142 may store information identifying which MMEs (e.g., MME 132) are supporting which UEs (e.g., UE 110).

PDN 150 may include one or more networks, such as a local area network (LAN), a wide area network (WAN), a metropolitan area network (MAN), a telephone network, the Internet, etc., capable of facilitating communication with UE 110. In one example, PDN 150 may include a network that breaks up a message (e.g., information) into packets for transmission. Unlike a circuit switching network, which requires establishment of a dedicated point-to-point connection, each packet in PDN 150 may include a destination address. Thus, packets in a single message may not travel the same path. As traffic conditions change in PDN 150, the packets may be dynamically routed via different paths in PDN 150, and the packets may even arrive out of order. A destination device in PDN 150 may reassemble the packets into their proper sequence. In one example implementation, PDN 150 may include multiple PDNs, such as a first PDN 150-1, a second PDN 150-2, etc., which may be accessed by UE 110.

SMSC 160 may include one or more server devices, or other types of computation and communication devices, that gather, process, and/or provide information in a manner described herein. For example, SMSC 160 may be responsible for handling SMS operations of network 100. When a SMS message is sent from UE 110, SMSC 160 may receive the SMS message and may forward the SMS message towards a destination. If a recipient of the SMS message is unavailable (e.g., when a receiving UE 110 is turned off), SMSC 160 may store the SMS message.

SMSC 160 may support NAS transparent messages for applications associated with UE 110. SMSC 160 may receive messages from application servers (e.g., application server 170) using protocols, such as the Short Message Peer-to-Peer (SMPP) protocol. SMSC 160 may reformat the messages received from the application servers into NAS transparent messages to be delivered to UE 110. The Sh interface may enable SMSC 160 to query HSS 142 for an identification of a MME currently serving a UE to which SMSC 160 is delivering NAS transparent messages. The V6a may enable SMSC 160 to deliver NAS transparent messages to the identified MME that is currently serving the UE.

In one example implementation, SMSC 160 may receive, from application server 170, a mobile terminated (MT) message for UE 110, and may reformat the MT message into a NAS transparent message. SMSC 160 may query HSS 142 for an identification of a MME (e.g., MME 132) serving UE 110, and may receive, from HSS 142 and based on the query, the identification of MME 132. SMSC 160 may provide the NAS transparent message to the identified MME 132 (e.g., for providing to UE 110), and may receive, from MME 132, a NAS transparent response generated by UE 110 in response to the NAS transparent message. SMSC 160 may then provide the NAS transparent response to application server 170.

Application server 170 may include one or more server devices, or other types of computation and communication devices, that gather, process, and/or provide information in a manner described herein. For example, application server 170 may include a subscriber identity module (SIM) over-the-air (OTA) server that provides applications for a Universal Integrated Circuit Card (UICC), a SIM card, an OTA card, etc. provided in UE 110. Alternatively, or additionally, application server 170 may include an open mobile alliance (OMA) device management (DM) server that provides applications for UE 110, such as provisioning applications, device configuration applications, software upgrades, fault management applications, etc.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
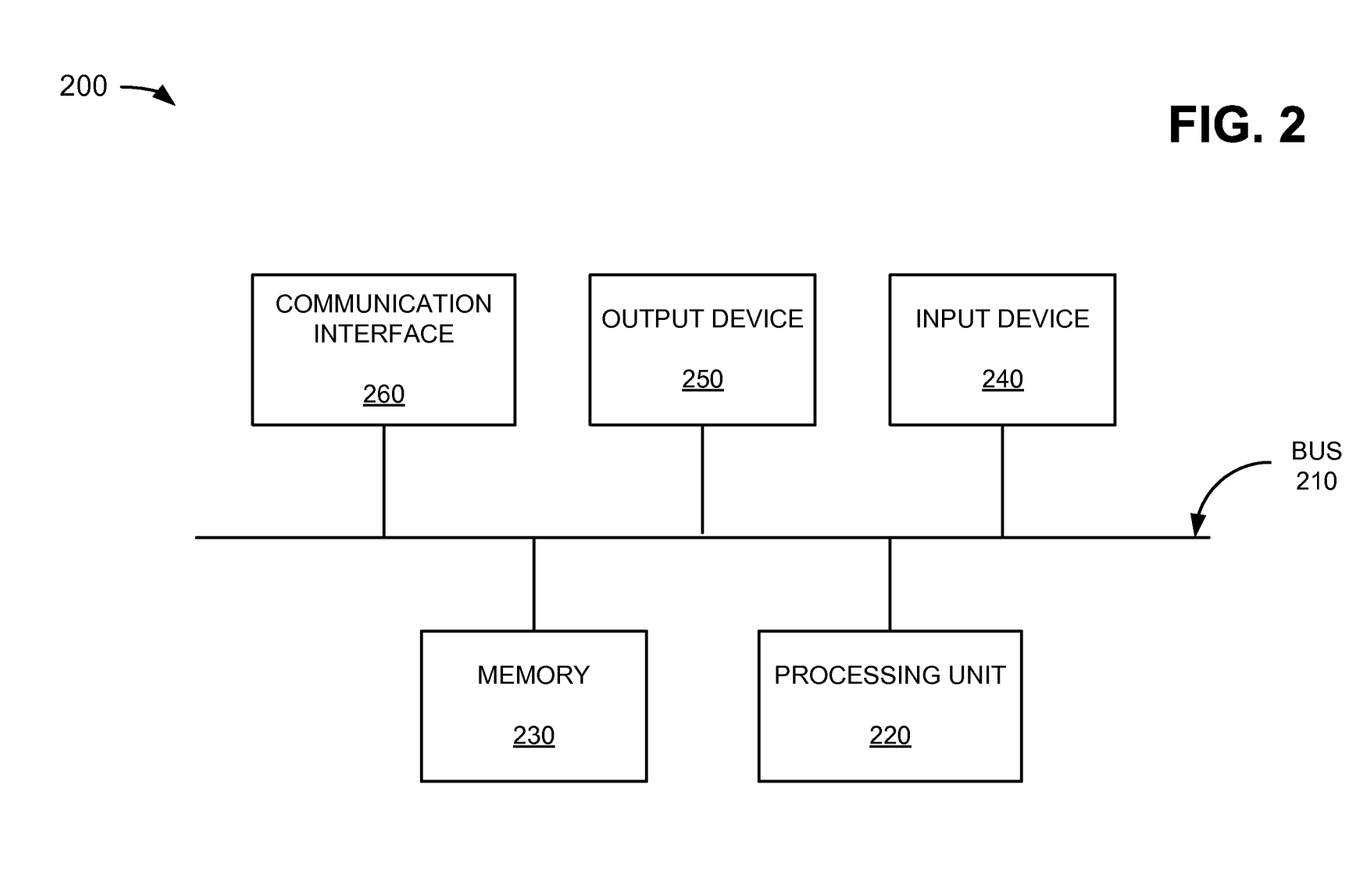
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
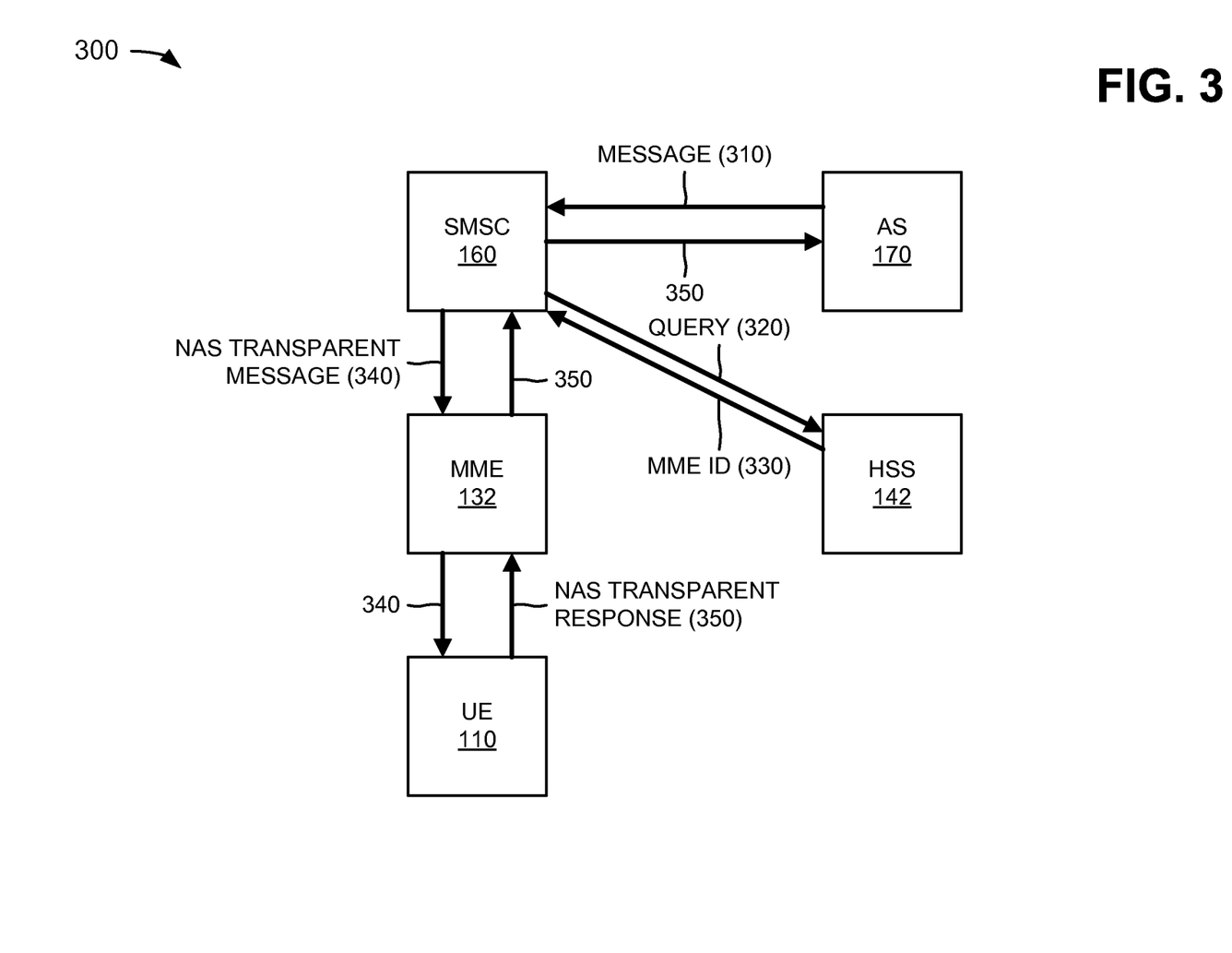
FIG. 3 is a diagram of example operations capable of being performed by an example portion of the network in FIG. 1.

FIG. 3 is a diagram of example operations capable of being performed by an example network portion 300 of network 100 (FIG. 1). As shown in FIG. 3, network portion 300 may include UE 110, MME 132, HSS 142, SMSC 160, and application server 170. UE 110, MME 132, HSS 142, SMSC 160, and application server 170 may include the features described above in connection with, for example, one or more of FIGS. 1 and 2.

As further shown in FIG. 3, application server 170 may provide a message 310 to SMSC 160 by using a protocol, such as the SMPP protocol. In one example, message 310 may include a mobile terminated (MT) message (e.g., a network triggered message to an application client of UE 110) to be provided to UE 110; a SIM OTA message (e.g., that includes SIM OTA client wake-up information) that instructs a SIM OTA client of a UICC of UE 110 to poll network 100 for additional information; a OMA DM message (e.g., that includes OMA DM client wake-up information) that instructs a OMA DM client of UE 110 to poll network 100 for additional information; etc. Alternatively, or additionally, message 310 may include a short command message for applications provided in UE 110, the UICC, or other secondary devices associated with UE 110 (e.g., a secure digital (SD) memory card). SMSC 160 may receive message 310 from application server 170, and may, based on message 310, provide a query 320 to HSS 142 via the Sh interface (not shown in FIG. 3). Query 320 may include a request for an identification of a MME serving UE 110. HSS 142 may retrieve an identification 330 of MME 132 based on query 320, and may provide identification 330 of MME 132 to SMSC 160.

SMSC 160 may receive identification 330 of MME 132 from HSS 142. SMSC 160 may reformat message 310 into a NAS transparent message 340. Content of NAS transparent message 340 may be transparent to MME 132 so that MME 132 may not need to decode and understand the content of NAS transparent message 340. UE 110 and application server 170 may agree on a format of the content of NAS transparent message 340. NAS transparent message 340 may include a flag to indicate a nature of the message and an application of UE 110 to which the message is to be sent. SMSC 160 may provide NAS transparent message 340 to MME 132 identified by identification 330 and via the V6a interface (not shown in FIG. 3).

MME 132 may receive NAS transparent message 340, and may forward NAS transparent message 340 to UE 110. UE 110 may receive NAS transparent message 340, and may analyze the flag in NAS transparent message 340. If UE 110 does not recognize the flag in NAS transparent message 340, UE 110 may ignore NAS transparent message 340. If UE 110 recognizes the flag in NAS transparent message 340, UE 110 may analyze an identifier in NAS transparent message 340 to determine a purpose of NAS transparent message 340. For example, if NAS transparent message 340 is for a UICC of UE 110, then UE 110 may utilize NAS transparent message 340 for the UICC. As further shown in FIG. 3, UE 110 may provide, to MME 132, a NAS transparent response 350 that responds to NAS transparent message 340. MME 132 may forward NAS transparent response 350 to SMSC 160, and SMSC 160 may receive NAS transparent response 350. SMSC 160 may forward NAS transparent response 350 to application server 170, and application server 170 may communicate with UE 110 (e.g., via mechanisms other than NAS messages) based on NAS transparent response 350. In one example, NAS transparent response 350 may be omitted and/or replaced with an ordinary (i.e., non-NAS transparent) response.

In one example implementation, SMSC 160 may enable more information (e.g., message 310, NAS transparent message 340, and NAS transparent response 350) to be exchanged between UE 110 and application server 170 than may be permitted via a typical IP transport. In one example, NAS transparent message 340 may include a downlink generic NAS transport message according to the following format (e.g., as defined in 3GPP Technical Specification (TS) 24.301).

| Information Element | Type | Presence | Format | Length |
|---|---|---|---|---|
| Protocol discriminator | Protocol discriminator 9.2 | M | V | ½ |
| Security header type | Security header type 9.3.1 | M | V | ½ |
| Downlink generic NAS transport message identity | Message type 9.8 | M | V | 1 |
| Generic message container type | Generic message container type 9.9.3.42 | M | V | 1 |
| Generic message container | Generic message container 9.9.3.43 | M | LV-E | 3-n |
| Additional information | Additional information 9.9.2.0 | O | TLV | 3-n |

As shown, NAS transparent message 340 may include information elements (e.g., a generic message container type, described below in FIGS. 4 and 5), types (e.g., a generic message container type), a presence, a format, and a length. In one example, NAS transparent response 350 may include an uplink generic NAS transport message according to the following format (e.g., as defined in 3GPP TS 24.301).

| Information Element | Type | Presence | Format | Length |
|---|---|---|---|---|
| Protocol discriminator | Protocol discriminator 9.2 | M | V | ½ |
| Security header type | Security header type 9.3.1 | M | V | ½ |
| Uplink generic NAS transport message identity | Message type 9.8 | M | V | 1 |
| Generic message container type | Generic message container type 9.9.3.42 | M | V | 1 |
| Generic message container | Generic message container 9.9.3.43 | M | LV-E | 3-n |
| Additional information | Additional information 9.9.2.0 | O | TLV | 3-n |

Although FIG. 3 show example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300. For example, although application server 170 is shown as generating an initial message 310, in other implementations, UE 110 may generate an initial message, such as a UE 110, UICC, or SD memory card triggered message to inform network 100 of particular events.

Figure 4:
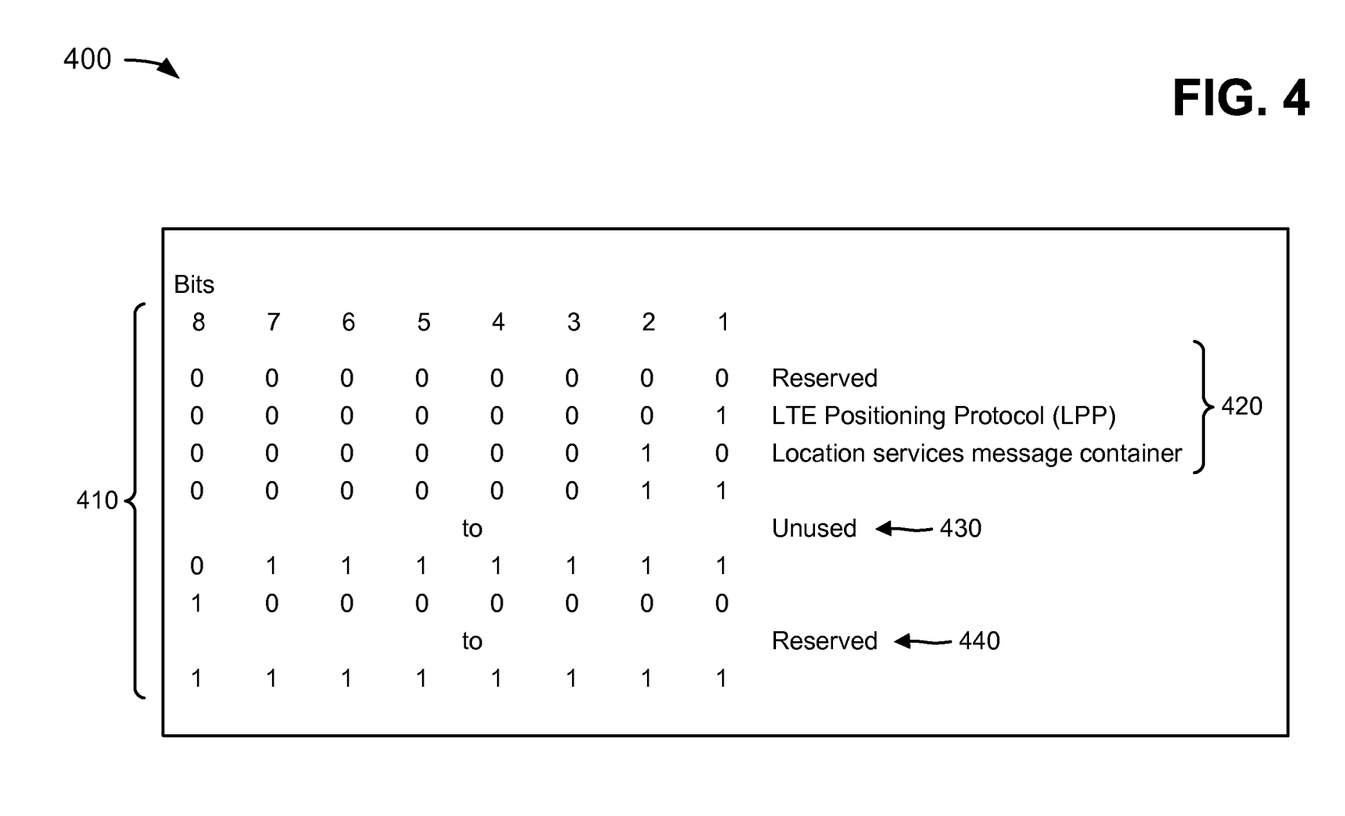
FIG. 4 is a diagram of an example NAS generic container message type information element.

FIG. 4 is a diagram of an example NAS generic container message type information element 400 as defined in 3GPP TS 24.301 (e.g., in the fourth information element of the above mentioned tables). As shown, information element 400 may include ranges of bits 410 that may be assigned to different functions. For example, bits 410 (0, 0, 0, 0, 0, 0, 0, 0) through (0, 0, 0, 0, 0, 0, 1, 0) may be assigned to certain functions 420, such as reserved, a LTE positioning protocol (LPP), and a location services message container. Bits 410 (0, 0, 0, 0, 0, 0, 1, 1) through (0, 1, 1, 1, 1, 1, 1, 1) may be unused, as indicated by reference number 430. Bits 410 (1, 0, 0, 0, 0, 0, 0, 0) through (1, 1, 1, 1, 1, 1, 1, 1) may be reserved, as indicated by reference number 440.

Although FIG. 4 show example information that may be provided in information element 400, in other implementations, information element 400 may include less information, different information, differently arranged information, or additional information than depicted in FIG. 4.

Figure 5:
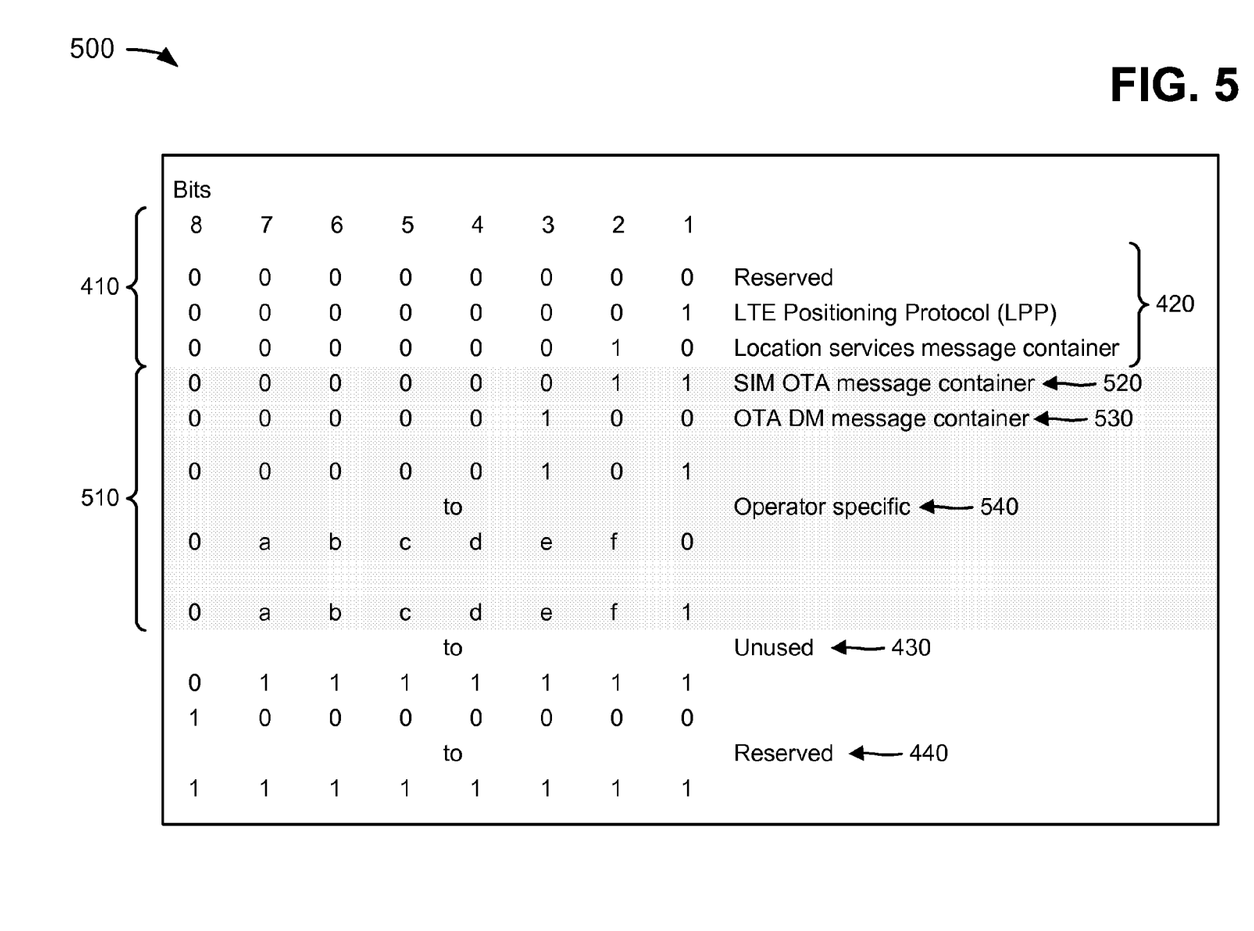
FIG. 5 is a diagram of an example modified NAS generic container message type information element capable of being generated by a short message service center (SMSC) of FIG. 1.

FIG. 5 is a diagram of an example modified NAS generic container message type information element 500 capable of being generated by a SMSC 160. Information element 500 may include a modified version of NAS generic container message type information element 400 as defined in 3GPP TS 24.301. In one example implementation, information element 500 may be included in message 310 to reformat message 310 into NAS transparent message 340.

As shown in FIG. 5, information element 500 may include the ranges of bits 410 and associated functions described above for information element 400 (FIG. 4). For example, bits 410 (0, 0, 0, 0, 0, 0, 0, 0) through (0, 0, 0, 0, 0, 0, 1, 0) may be assigned to certain functions 420, such as reserved, a LTE positioning protocol (LPP), and a location services message container. Bits 410 (0, a, b, c, d, e, f, 1) through (0, 1, 1, 1, 1, 1, 1, 1) may be unused, as indicated by reference number 430. Bits 410 (1, 0, 0, 0, 0, 0, 0, 0) through (1, 1, 1, 1, 1, 1, 1, 1) may be reserved, as indicated by reference number 440.

As further shown in FIG. 5, information element 500 may include additional ranges of bits 510 that may be assigned to different functions. For example, bits 510 (0, 0, 0, 0, 0, 0, 1, 1) may be used for a SIM OTA message container 520, and bits 510 (0, 0, 0, 0, 0, 1, 0, 0) may be used for an OMA DM message container 530. Bits 510 (0, 0, 0, 0, 0, 1, 0, 1) through (0, a, b, c, d, e, f, 0) may be operator specific, as indicated by reference number 540. In one example bits 510 (0, a, b, c, d, e, f, 0) may be greater than bits 510 (0, 0, 0, 0, 0, 1, 0, 1), and bits 410 (0, a, b, c, d, e, f, 1) may be greater than or equal to bits 410 (0, 1, 1, 1, 1, 1, 1, 1).

Although FIG. 5 shows example information that may be provided in information element 500, in other implementations, information element 500 may contain less information, different information, differently arranged information, and/or additional information than depicted in FIG. 5.

Figure 6:
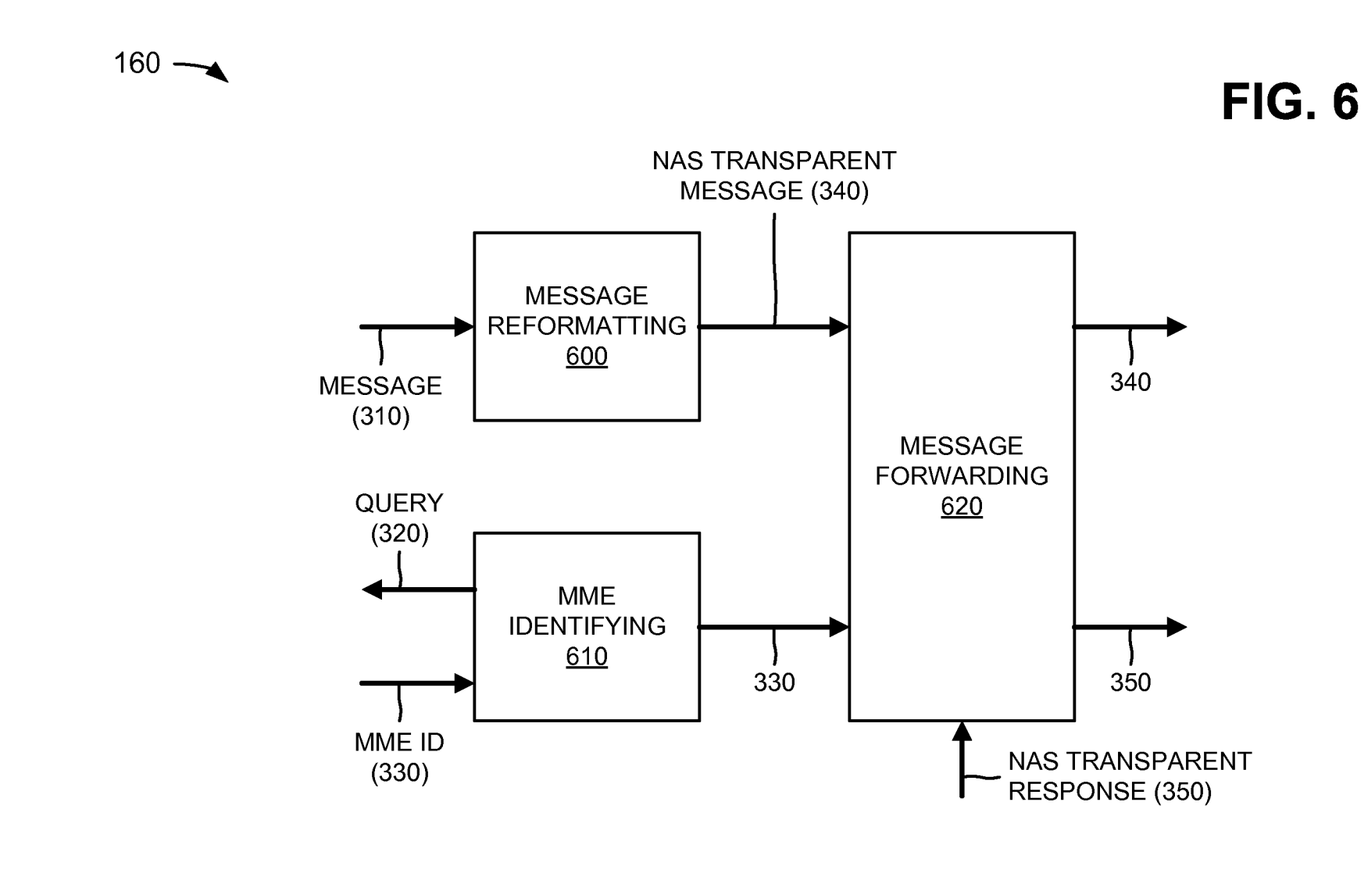
FIG. 6 is a diagram of example functional components of the SMSC.

FIG. 6 is a diagram of example functional components of SMSC 160. In one implementation, the functions described in connection with FIG. 6 may be performed by one or more components of device 200 (FIG. 2) or by one or more devices 200. As shown in FIG. 6, SMSC 160 may include a message reformatting component 600, a MME identifying component 610, and a message forwarding component 620.

Message reformatting component 600 may receive message 310 from application server 170 (not shown in FIG. 6), and may reformat message 310 into NAS transparent message 340. In one example, message reformatting component 600 may reformat message 310 to include modified NAS generic container message type information element 500 (FIG. 5) in NAS transparent message 340. As further shown in FIG. 6, message reformatting component 600 may provide NAS transparent message 340 to message forwarding component 620.

MME identifying component 610 may, based on message 310, provide query 320 to HSS 142 (not shown in FIG. 6). Based on query 320, MME identifying component 610 may receive identification 330 of MME 132 from HSS 142. As further shown in FIG. 6, MME identifying component 610 may provide identification 330 of MME 132 to message forwarding component 620.

Message forwarding component 620 may receive NAS transparent message 340 from message reformatting component 600, and may receive identification 330 of MME 132 from MME identifying component 610. Based on identification 330, message forwarding component 620 may forward NAS transparent message 340 to MME 132 (not shown in FIG. 6). As further shown in FIG. 6, message forwarding component 620 may receive NAS transparent response 350 from MME 132 (not shown in FIG. 6), and may forward NAS transparent response 350 to application server 170 (not shown in FIG. 6).

Although FIG. 6 shows example functional components of SMSC 160, in other implementations, SMSC 160 may include fewer functional components, different functional components, differently arranged functional components, or additional functional components than depicted in FIG. 6. Alternatively, or additionally, one or more functional components of SMSC 160 may perform one or more other tasks described as being performed by one or more other functional components of SMSC 160.

Figure 7:
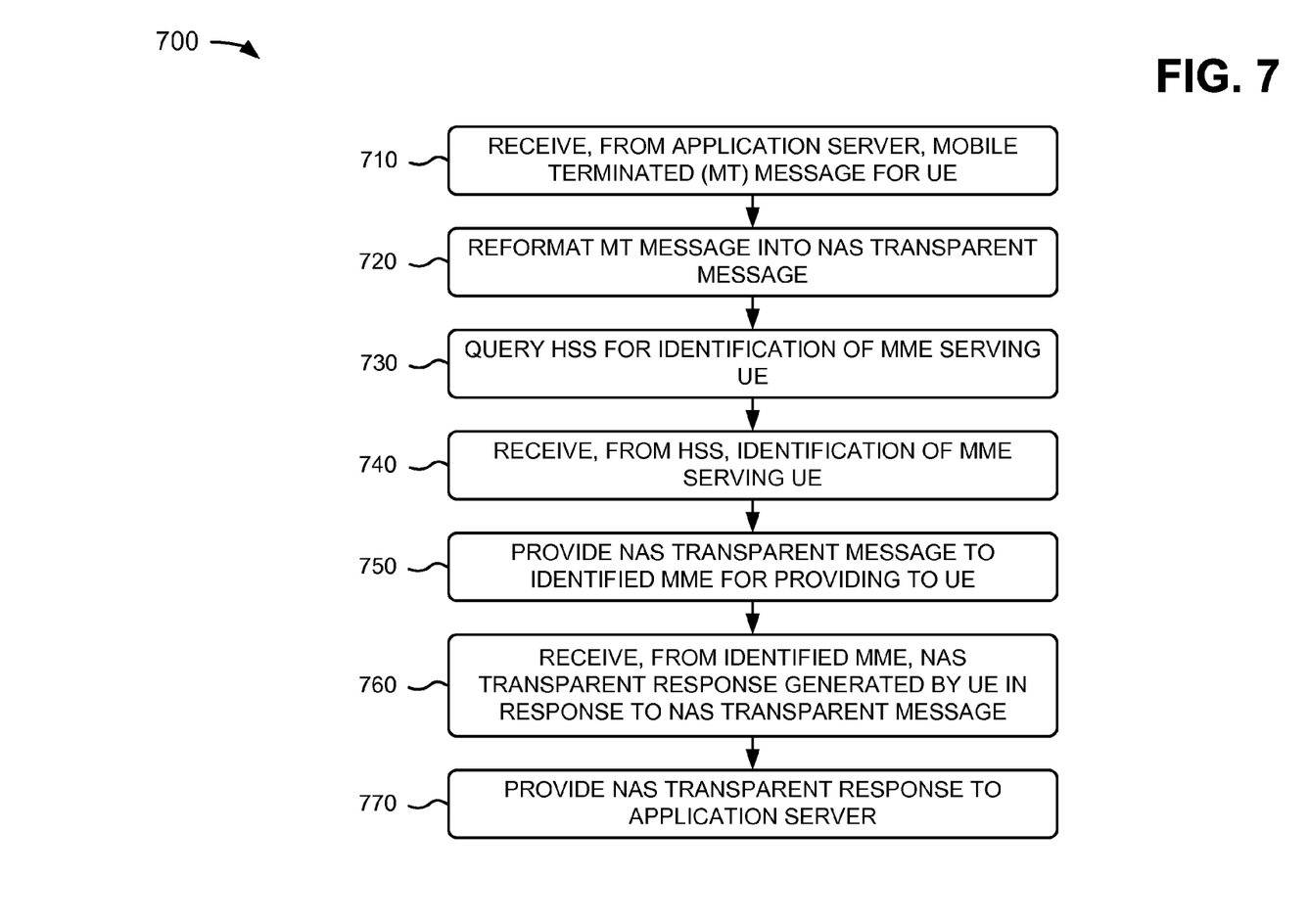
FIG. 7 is a flow chart of an example process for providing NAS transparent messaging according to an implementation described herein.

FIG. 7 is a flow chart of an example process 700 for providing NAS transparent messaging according to an implementation described herein. In one implementation, process 700 may be performed by SMSC 160. Alternatively, or additionally, some or all of process 700 may be performed by another device or group of devices, including or excluding SMSC 160.

As shown in FIG. 7, process 700 may include receiving, from an application server, a mobile terminated (MT) message for a UE (block 710), and reformatting the message into a NAS transparent message (block 720). For example, in an implementation described above in connection with FIG. 3, application server 170 may provide message 310 to SMSC 160 by using a protocol, such as the SMPP protocol. In one example, message 310 may include a mobile terminated (MT) message (e.g., a network triggered message to an application client of UE 110) to be provided to UE 110. SMSC 160 may receive message 310 from application server 170, and may reformat message 310 into NAS transparent message 340. Content of NAS transparent message 340 may be transparent to MME 132 so that MME 132 may not need to decode and understand the content of NAS transparent message 340. UE 110 and application server 170 may agree on a format of the content of NAS transparent message 340. NAS transparent message 340 may include a flag to indicate a nature of the message and an application of UE 110 to which the message is to be sent.

As further shown in FIG. 7, process 700 may include querying a HSS for an identification of a MME serving the UE (block 730), and receiving, from the HSS and based on the query, an identification of a MME serving the UE (block 740). For example, in an implementation described above in connection with FIG. 3, based on message 310, SMSC 160 may provide query 320 to HSS 142 via the Sh interface. Query 320 may include a request for an identification of a MME serving UE 110. HSS 142 may retrieve identification 330 of MME 132 based on query 320, and may provide identification 330 of MME 132 to SMSC 160. SMSC 160 may receive identification 330 of MME 132 from HSS 142.

Returning to FIG. 7, process 700 may include providing the NAS transparent message to the identified MME for providing to the UE (block 750), and receiving, from the identified MME, a NAS transparent response generated by the UE in response to the NAS transparent message (block 760). For example, in an implementation described above in connection with FIG. 3, SMSC 160 may provide NAS transparent message 340 to MME 132 identified by identification 330 and via the V6a interface. MME 132 may receive NAS transparent message 340, and may forward NAS transparent message 340 to UE 110. UE 110 may receive NAS transparent message 340, and may analyze the flag in NAS transparent message 340. If UE 110 recognizes the flag in NAS transparent message 340, UE 110 may analyze an identifier in NAS transparent message 340 to determine a purpose of NAS transparent message 340. UE 110 may provide, to MME 132, NAS transparent response 350 that responds to NAS transparent message 340. MME 132 may forward NAS transparent response 350 to SMSC 160, and SMSC 160 may receive NAS transparent response 350.

As further shown in FIG. 7, process 700 may include providing the NAS transparent response to the application server (block 770). For example, in an implementation described above in connection with FIG. 3, SMSC 160 may forward NAS transparent response 350 to application server 170, and application server 170 may communicate with UE 110 (e.g., via mechanisms other than NAS messages) based on NAS transparent response 350.

Systems and/or methods described herein may enable NAS transparent messages to be provided between a MME and a UE. Content of the NAS transparent messages may be transparent to the MME so that the MME may not need to decode and understand the content of the messages. The UE and a device (e.g., an application server) originating or receiving the NAS transparent message may agree on a format of the content. The NAS transparent message may include a flag to indicate a nature of the message and an application to which the message is to be sent. If the UE does not recognize the flag in the NAS transparent message, the UE may ignore the NAS transparent message. The NAS transparent messaging provided by the systems and/or methods may enable more information to be exchanged between a UE and a MME (or an application server) than may be permitted via a typical IP transport.

Furthermore, while a series of blocks has been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a device and from an application server, a message destined for a user equipment;
    reformatting, by the device, the message into a non-access stratum (NAS) transparent message, wherein the NAS transparent message includes a flag to indicate a nature of the NAS transparent message and an application of the user equipment to which the NAS transparent message is directed; providing, by the device and to a home subscriber server, a query for an identification of a mobility management entity serving the user equipment; receiving, by the device and from the home subscriber server, the identification of the mobility management entity serving the user equipment; and
    providing, by the device, the NAS transparent message to the identified mobility management entity,
    where the mobility management entity forwards the NAS transparent message to the user equipment.

2. The method of claim 1, further comprising:
    receiving, from the mobility management entity, a response generated by the user equipment in response to the NAS transparent message; and
    providing the response to the application server.

3. The method of claim 2, where the response includes a NAS transparent response.

4. The method of claim 1, where the message includes one of:
    a mobile terminated (MT) message,
    a subscriber identity module (SIM) over-the-air (OTA) message that includes SIM OTA client wake-up information, or
    an open mobile alliance (OMA) device management (DM) message that includes OMA DM client wake-up information.

5. The method of claim 1, where content of the NAS transparent message is transparent to the mobility management entity so that decoding of the content of the NAS transparent message is not required.

6. The method of claim 1, where the NAS transparent message includes a modified version of a NAS generic container message type information element defined in Third Generation Partnership Project (3GPP) Technical Specification (TS) 24.301.

7. A device, comprising:
    a processor to:
        receive, from an application server, a message destined for a user equipment,
        reformat the message into a non-access stratum (NAS) transparent message, wherein the NAS transparent message includes a flag to indicate a nature of the NAS transparent message and an application of the user equipment to which the NAS transparent message is directed, query a home subscriber server for an identification of a mobility management entity serving the user equipment, receive, from the home subscriber server, the identification of the mobility management entity serving the user equipment, and provide the NAS transparent message to the identified mobility management entity for forwarding to the user equipment.

8. The device of claim 7, where the processor is further to:

receive, from the mobility management entity, a response generated by the user equipment in response to the NAS transparent message, and provide the response to the application server.

9. The device of claim 8, where the response includes a NAS transparent response.

10. The device of claim 7, where the message includes one of:

a subscriber identity module (SIM) over-the-air (OTA) message that includes SIM OTA client wake-up information, or an open mobile alliance (OMA) device management (DM) message that includes OMA DM client wake-up information.

11. The device of claim 7, where content of the NAS transparent message is transparent to the mobility management entity.

12. The device of claim 7, where the NAS transparent message includes a modified version of a NAS generic container message type information element defined in Third Generation Partnership Project (3GPP) Technical Specification (TS) 24.301.

13. The device of claim 7, where the device includes a short message service center (SMSC) device.

14. A non-transitory computer-readable medium, comprising:

one or more instructions that, when executed by a processor of a device, cause the processor to:

receive, from an application server, a message destined for a user equipment, reformat the message into a non-access stratum (NAS) transparent message, wherein the NAS transparent message includes a flag to indicate a nature of the NAS transparent message and an application of the user equipment to which the NAS transparent message is directed, provide, to a home subscriber server, a query for an identification of a mobility management entity serving the user equipment, receive, from the home subscriber server and based on the query, the identification of the mobility management entity serving the user equipment, and provide the NAS transparent message to the identified mobility management entity, where the mobility management entity forwards the NAS transparent message to the user equipment.

15. The computer-readable medium of claim 14, further comprising:

one or more instructions that, when executed by the processor of the device, cause the processor to:

receive, from the mobility management entity, a response generated by the user equipment in response to the NAS transparent message, and provide the response to the application server.

16. The computer-readable medium of claim 15, where the response includes a NAS transparent response.

17. The computer-readable medium of claim 14, where the message includes one of:

a mobile terminated (MT) message, a subscriber identity module (SIM) over-the-air (OTA) message, or an open mobile alliance (OMA) device management (DM) message.

18. The computer-readable medium of claim 14, where content of the NAS transparent message is transparent to the mobility management entity so that decoding of the content of the NAS transparent message is not required.

19. The computer-readable medium of claim 14, where the NAS transparent message includes a modified version of a NAS generic container message type information element defined in Third Generation Partnership Project (3GPP) Technical Specification (TS) 24.301.

* * * * *